United States Patent Office 3,559,493
Patented Feb. 2, 1971

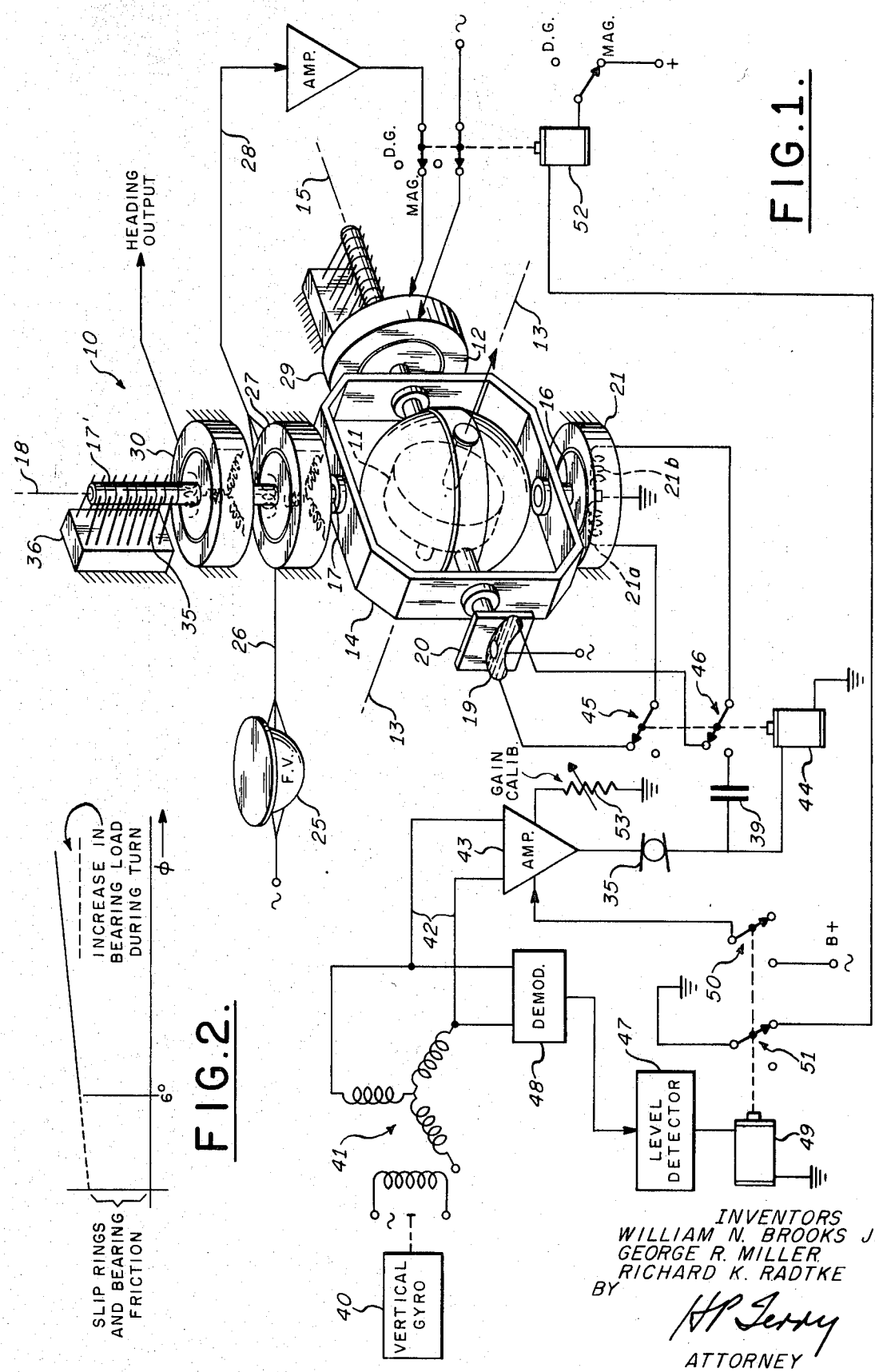

3,559,493
DIRECTIONAL GYRO TURN ERROR COMPENSATOR
William N. Brooks, Jr., and George R. Miller, Phoenix, Ariz., and Richard K. Radtke, Newbury Park, Calif., assignors to Sperry Rand Corporation, a corporation of Delaware
Filed Oct. 24, 1968, Ser. No. 770,313
Int. Cl. G01c 19/30
U.S. Cl. 74—5.45      5 Claims

ABSTRACT OF THE DISCLOSURE

A directional gyro for aircraft in which inner gimbal precession due to frictional forces about the d.g. vertical ring support axis produced by slip rings and bearings during a turn are compensated by applying an equal and opposite torque about the vertical axis dependent upon craft bank angle exceeding a predetermined value in either direction whereby to prevent a residual azimuthal error from building up as a result of continuous banked turns in the same direction.

BACKGROUND OF THE INVENTION

The present invention relates generally to directional gyro systems for aircraft and more particularly to apparatus for compensating for the effects of frictional loads acting about the vertical axis trunnion of the directional gyroscope and tending to precess the spin axis out of level during a turn.

There are two primary sources of friction at the vertical trunnions of a directional gyro, these are the slip ring contact required to supply electrical energy to the gyro rotor, torquers, pick-offs, liquid levels, etc., and the running friction of the vertical axis support bearings. Each of these sources contributes about one half the total load and are independent of bank angle, although a small load component proportional to bank angle does occur due to radial loading of the bearings in a banked turn. Friction loads experienced during turning of the craft about the gyroscope vertical axis result in a precession of the gyro spin axis out of the horizontal plane, and in a banked turn, out of the vectorial plane, resulting in an azimuth error at the end of the turn. Since the torque is always in the direction of the turn, the error is cumulative for successive turns in a particular direction, such as occurs in holding patterns at busy airports.

Various techniques have been applied in the past in an attempt to compensate for the effects of slip ring friction and bearing loading of gyroscopes. For example, the slip rings and/or the bearings have been dithered to overcome static friction and to a degree unidirectional friction. More recently, multiple race bearings, and in some cases slip ring blocks mounted on an intermediate race, have been driven in various manners in an attempt to reduce the effects of frictional load on the gyro trunnions. Such techniques, while successful, are mechanically complex and costly to manufacture and, of course, cannot be readily retrofitted into existing gyroscopes.

SUMMARY OF THE INVENTION

The technique disclosed herein for compensating for the effects of the above-described frictional torques about the vertical trunnions of a directional gyro during turns is very simple and inexpensive and yet very effective. Its simplicity resides in the fact that no major modification of gyro design is required and the only change needed is the addition of a single slip ring, a switch, minor electronics, and a source of compensating signal, i.e., a signal proportional to craft bank angle, the latter being readily available in present day aircraft. Thus, in accordance with the teachings of the present invention, a signal proportional t ocraft bank angle is employed as a turn detector and simultaneously as a source of compensating signal which is applied to a torque motor effective about the gyro's vertical axis, the signal having a magnitude and sense such that the torque produced thereby is substantially equal and opposite to the frictional effects produced by the slip rings and bearings during the turn.

BRIEF DESCRIPTION OF THE DRAWINGS

A preferred embodiment of the present invention is set forth in the following specification and drawings, wherein:

FIG. 1 is a schematic illustration of a gyromagnetic compass system embodying the teachings of the present invention; and FIG. 2 is a graph illustrating the character of the compensating signal.

DESCRIPTION OF THE PREFERRED EMBODIMENT

As shown in FIG. 1, the invention has been incorporated in a conventional gyromagnetic compass system in which a magnetic reference slaves the spin axis of the directional gyro to the magnetic meridian. However, it will be understood, of course, that the invention may be employed in any of a number of directional gyro arrangements.

The directional gyro is designated generally by reference character 10 and comprises a rotor 11 mounted in a rotor case 12 for spinning about a normally horizontal axis 13. Rotor case 12 in turn is journaled by means of suitable bearings in a vertical ring 14 for rotation about a further horizontal axis 15 at right angle to the spin axis 13. The vertical ring 14 is provided with lower and upper trunnions 16 and 17 which are journaled in suitable ball bearings (not shown) fixed in a gyro housing (also not shown) which, in turn, is mounted in the aircraft in such a manner that the trunnions 16 and 17 of vertical ring 14 extend along a vertical axis 18 parallel to the vertical axis of the aircraft. The gyro rotor 11 is spun by an electric motor (not shown) and for the purpose of normally maintaining the spin axis 13 horizontal, a liquid level 19 is secured to a plate 20 rigidly secured to the end of the horizontal trunnion of rotor case 12. Liquid level 19 is provided with spaced electrodes electrically connected to the split phase winding of a torque motor 21. Torquer 21 has its stator fixed to the gyro housing and its rotor fixed to the vertical trunnion 16. Thus, should the spin axis 13 tend to tilt out of the horizontal, liquid level 19 will sense such tilt and apply a torque about the vertical axis 18 in a direction to relevel the same.

The long term directional reference of the present compass system comprises a conventional flux valve 25 which provides an electrical vector in leads 26 corresponding to the direction of the earth's magnetic field relative to the aircraft. This electrical vector is reproduced in the stator of the flux valve synchro 27 the rotor of which is positioned by vertical trunnion 17 of the gyro. The output of synchro 27 on lead 28 is therefore proportional to the difference in directional orientation between the earth's field and the spin axis 13 of the directional gyro. This flux valve-gyro error signal is amplified and applied to a torque motor 29, which may be similar to torque motor 21, mounted on the vertical ring 14 and effective to apply a torque about horizontal axis 15 and hence a precession of the spin axis 13 about vertical axis 18 to thereby reduce the error to zero. Synchro 30, positioned by vertical trunnion 17, provides the heading output of the system.

It will be noted that the gyro spin motor, torquers 21 and 29, synchros 27 and 30 and liquid level 19 all require electrical power for their operation and for this purpose a large plurality of slip ring brushes, indicated generally at 35 are provided. The brushes are suitably mounted in a brush block 36 fixed to the gyro housing and may be of the "hair pin" type. The brushes are slightly spring loaded in order to provide good electrical contact with the slip rings carried by an extension 17' of the vertical trunnion 17.

It is the effect of the friction loads imposed by slip ring assembly 35 on the vertical axis trunnion 17' and the running friction of the ball bearings supporting trunnions 16 and 17 that results in a turn error being accumulated, especially after extended turns in the same direction. Depending upon the direction of rotation of the rotor 11, if the aircraft should make, for example a 360° turn, the total friction load on the vertical trunnions will result in a torque about the vertical axis 18 and hence a precession of the spin axis 13 out of the horizontal. It should be noted that during the same 360° turn the levelling torque produced by acceleration effects on liquid level 19 will, for the first 180°, produce a precession of the spin axis 13 out of the horizontal in one direction and for the last half of the turn, will produce an opposite precession of the spin axis 13 thereby resulting in no net error due to the liquid level torques. However, since the frictional load on vertical trunnions continues in the same direction, a net tilt of the spin axis 13 will occur at the end of the turn and result in an azimuth error. The reason for this is as follows. If the vertical trunnion did not tilt with the aircraft, the precession of the spin axis 13 would be in the vertical plane only and therefore have no azimuth component. However, since the vertical ring 14 and trunnions 16 and 17 are fixed in the aircraft, the vertical ring tilts relative to the horizontal ring 12 when the aircraft banks and this tilt results in the precession of spin axis 13 to be no longer in a vertical plane. When the spin axis is precessed in a tilted plane, an azimuth component in addition to the normal levelling component is present and this azimuth component results in a turn error which remains after the aircraft resumes level flight.

In accordance with the teachings of the present invention, this turn error is compensated by preventing precession of spin axis 13 by a "one way" torque, i.e. by applying a torque about the vertical axis trunnion which is equal and opposite to the frictional torque. Since the frictional torque manifests itself only on relative turning motion between the gyro and the craft a signal proportional to craft bank angle is used as the turn detector and since the frictional load continues during the turn maneuver a predetermined value of bank angle signal is used to compensate for the effects thereof. It will be understood that since the frictional torque due to slip rings and bearing running friction is predeterminable and independent of bank angle, a fixed value of compensating signal could be applied at the predetermined value of bank angle. However, this signal must be reversed in sense dependent upon direction of turn. Since bank angle reverses sense and also since radial load due to bank angle increases slightly with bank angle, the bank angle signal itself is used as the source of compensating signal, thus to simultaneously compensate for slip ring and bearing running friction as well as for the increase in radial bearing load due to bank attitude. The character of the compensating signal is illustrated in FIG. 2. It will be noted that the frictional torque manifests itself instantaneously but since its effect is not significant at low bank angles, a low value threshold bank angle of about 6° is selected.

The source of the bank angle signal is a conventional vertical gyro 40 having a roll signal generator, such as a synchro 41, which produces across leads 42 a signal variable in phase and amplitude with the direction and magnitude of craft bank angle. This bank angle signal is applied to an amplifier 43, the phase sensitive output of which is applied to sensitive relay 44 which in turn controls switches 45, 46 connected in the circuit between liquid level 19 and vertical axis torquer 21. Relay 44 is incorporated for the purpose of limiting the number of slip rings (35) required to perform the switching function of the present invention. Switch 44 operates upon the existence of a very low voltage at the output of amplifier 43. Switch 45 serves to remove one liquid level contact from its corresponding torquer winding while switch 46 serves to likewise remove the other liquid level contact from its torquer winding and simultaneously to substitute the compensation signal therefor and apply it to torquer winding 21b. A condenser 39 serves to provide proper phase shift for torque motor operation.

Since, for small bank angles, the described azimuthal error will be negligible, it is desired not to apply the bank angle signal to the vertical axis torquer until the bank angle exceeds some predetermined value, say 6°. For this purpose a signal level or threshold detector 47 is provided and is energized by the output of a demodulator 48 responsive to the bank angle signal across leads 42. Detector 47 operates a relay 49 when the bank angle exceeds six degrees, which, in turn, operates a switch 50 to render the compensator amplifier 43 effective by supplying energizing power thereto. The magnitude and gradient of the torque required to buck out the frictional torques due to the brushes and slip rings, and increased radial loading, respectively, is determined by test procedures and is then adjusted by controlling the gain of the amplifier 43 through gain calibrator potentiometer 53.

It will be noted that torque motor 21 is a split phase torque motor having a first winding 21a and second winding 21b, each of these windings being excited by signals from respective electrodes of liquid level 19 through normally de-energized switches 45 and 46. Since the output of bank angle synchro 41 has a phase dependent upon the direction of bank, switches 45 and 46 are arranged such as to supply the compensating signal to only one phase, for example, phase 21b, of torquer 21 while the other phase 21a is simply rendered ineffective.

If the gyromagnetic compass system of the present invention is operating in its magnetic or slave mode, it is also desirable to cut out the slaving during turns of the aircraft. For this purpose, the level detector 47 relay also controls a switch 51 which is arranged to energize a further relay 52 for rendering ineffective the slaving torquer 29.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A directional reference system for aircraft comprising
    (a) a directional gyroscope having a rotor, an inner gimbal for supporting said rotor for spinning about a first normally horizontal axis and a vertical gimbal for supporting said inner gimbal for rotation about a second horizontal axis at right angles to said first axis, said vertical gimbal being supported in said aircraft for rotation about a third axis normally at right angles to said first and second axes and parallel to the aircraft vertical axis,
    (b) torque motor means coupled with said vertical gimbal for applying a torque thereto about said third support axis,
    (c) means for supplying a signal dependent upon the bank angle of said aircraft,
    (d) a source of compensation signal proportional to frictional torques due to undesirable frictional restraints about said third axis during turning of said aircraft, and
    (e) means responsive to a predetermined value of said bank angle signal for supplying said compensation signal to said torque motor means whereby to prevent precession of said spin axis about said second horizontal axis during turning of said aircraft.

2. The directional reference system as set forth in claim 1 wherein said compensation signal source includes said bank angle signal.

3. The directional reference system as set forth in claim 2 further including level sensing means coupled with said inner gimbal for supplying a signal during an unlevelled condition of said inner gimbal and for normally supplying said signal to said torque motor means whereby to maintain said inner gimbal horizontal, and wherein the means for supplying said compensation signal to said torque motor means includes switch means for substituting said level signal with said compensation signal.

4. The directional reference system as set forth in claim 3 wherein
   (a) said torque motor means comprises a split-phase torque motor and said level sensing means comprises a liquid level having an energizing electrode and two spaced electrodes, wherein
   (b) said compensation signal comprises a reversible phase signal dependent upon the direction of bank, and wherein
   (c) said switch means has contacts normally connecting said spaced electrodes with respective windings of said torque motor and further contacts for disconnecting one of said contacts and its respective motor winding and for disconnecting the other of said contacts and its respective motor winding and connecting said signal thereto.

5. The directional reference system as set forth in claim 4 wherein said compensation signal varies in magnitude dependent upon the magnitude of said bank angle signal.

References Cited

UNITED STATES PATENTS

| | | | |
|---|---|---|---|
| 1,096,253 | 5/1914 | Lang | 74—5.45 |
| 2,368,644 | 2/1945 | Curry, Jr. | 74—5 |
| 2,505,021 | 4/1950 | Weems et al. | 74—5.45X |
| 3,269,194 | 8/1966 | Buckley | 74—5 |
| 3,304,789 | 2/1967 | Summers | 74—5.45 |
| 3,321,980 | 5/1967 | Hildebrand | 74—5 |

MANUEL A. ANTONAKAS, Primary Examiner

U.S. Cl. X.R.

74—5